June 26, 1923.

E. V. HILL 1,460,128

HYDROTHERMOSTATIC SYSTEM

Filed March 29, 1920   3 Sheets-Sheet 1

Inventor
Earl V. Hill
Fisher Towle Clapp & Soons
Attys.

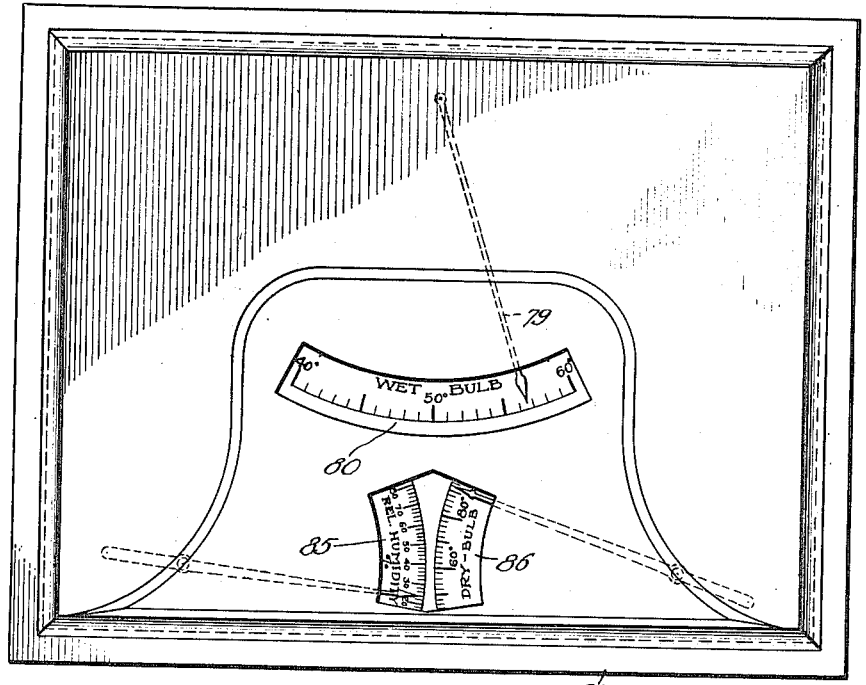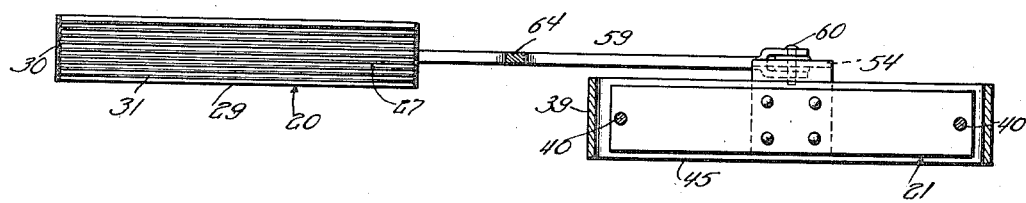

Patented June 26, 1923.

1,460,128

UNITED STATES PATENT OFFICE.

EARL V. HILL, OF CHICAGO, ILLINOIS.

HYDROTHERMOSTATIC SYSTEM.

Application filed March 29, 1920. Serial No. 369,527.

*To all whom it may concern:*

Be it known that I, EARL V. HILL, a citizen of the United States, residing at Chicago, in the county of Cook and State of Illinois, have invented certain new and useful Improvements in Hydrothermostatic Systems, of which the following is a specification.

My invention relates to hydro-thermostatic systems, and has special reference to means for automatically controlling air conditions in buildings, either those for human occupancy or in which are carried on manufacturing processes which require certain standard air conditions.

I am aware that there are at present on the market a number of systems for automatically controlling the temperature of the air in buildings and also for creating humidity conditions which are more or less closely regulated. In such systems, however, the heat supply is generally regulated in accordance with what I may term the dry-bulb temperature; that is to say, the temperature of the air as measured by an ordinary thermometer.

In those systems which control the humidity, the humidity is generally controlled and regulated through the agency of some form of hygroscope; that is to say, an instrument for measuring the moisture present in the atmosphere.

It is now generally accepted by physicians and ventilating experts that, so far as personal comfort is concerned, the humidity or percentage of moisture in the atmosphere is a very material factor, as well as temperature. In air of relatively high humidity, say 60 or 70 per cent, a temperature of 65° is not too low for personal comfort in offices, schools, or other similar buildings, and this is the condition which frequently exists during warm, damp weather in which it is unnecessary to supply any considerable amount of artificial heat. In very cold weather, on the other hand, when it is necessary to supply sufficient artificial heat to raise the temperature of the air from an outside temperature of say zero° F. to room temperature of 70° or over, the humidity of the air in a building thus heated is only a fraction of the per cent of saturation existing in the outside air. Frequently, in cases where no additional moisture is supplied, in very cold weather the humidity of the air in a room is as low as 20 per cent, and with such a low humidity percentage, it is found necessary for personal comfort to maintain a room temperature of 76° or 78°. Even where means are provided to supply moisture to the air of a building, it is found to be a very difficult matter in practice to raise the humidity about 30 or 40 per cent in extremely cold weather. Even with a moisture content of 40 per cent with artificial moistening, a temperature of 70° is by no means sufficient for the personal comfort of desk workers; and therefore it will be seen that in these cases where the temperature only is automatically controlled, the personal comfort of the room occupants may be seriously affected. As a matter of fact, I have found that in order to produce the same feeling of personal comfort, it is necessary to change the adjustment of the theremostatic devices as much as 10° F. when the weather changes from hot to cold, or vice versa.

I have discovered that for all practical purposes, the question of personal comfort is determined by what is termed the "wet-bulb" temperature of the air; that is to say, the temperature-reading of a thermometer in which the bulb is enclosed by a wick moistened with water, past which the air is rapidly circulating. This will be readily understood in view of the previous discussion, where I have brought out the fact that comfort is the result of two factors—temperature and humidity—both of which of course control the temperature-reading of a wet-bulb thermometer. I employ this principle in the automatic regulation of air-conditions, according to my invention.

Obviously, in providing for automatic regulation of air conditions, it is necessary that the air, the condition of which is being regulated or controlled, should have access to or act upon the devices which control said condition. This is of course true in the case of all of the ordinary dry-bulb thermostatic systems and must necessarily be so in the case of my improved wet-bulb control conditioning system. I have found, however, that with an ordinary wet-bulb thermometer employing a wick, the difficulties encountered, for instance the providing of a constant air circulation, a supply of distilled water, and exclusion of dust from the wick, are so great as to make an ordinary wet-bulb wick thermometer, in my opinion, wholly unsuitable for constant service. I have therefor found it necessary to devise an improved wet-bulb temperature-responsive device for controlling the air condition, said device at the same time being capable of indicating the equivalent wet-bulb temperature as it would be measured by an ordinary wet-bulb thermometer. Such a device as I have described, preferably, in this instance, comprises two different members or devices, one of which is responsive to change in humidity only, and the other is responsive to change in temperature only, the two members or devices being jointly or differentially arranged to convert their separate and distinct movements or effects into a combined joint or differential effect corresponding with the wet-bulb temperature.

Hence, it will be understood that the objects of my invention include the provision of a means and method for regulating an air condition in accordance with the wet-bulb temperature; to provide an improved system whereby the air-conditioning devices are responsive to the joint or differential effect of the moisture content and the dry-bulb temperature; to provide an improved apparatus responsive to the wet-bulb temperature and whereby the wet-bulb temperature of the atmosphere may be measured, or whereby air-conditioning agencies may be controlled; and, in general, to provide an improved method and apparatus of the character referred to.

In the drawings accompanying my application, I have illustrated a heat-controlling system for buildings equipped with my invention. In said drawings—

Fig. 2 is an outside view, also in elevation, of the box containing the apparatus;

Fig. 3 is a section taken on the line 3—3 of Fig. 1;

Figure 1:
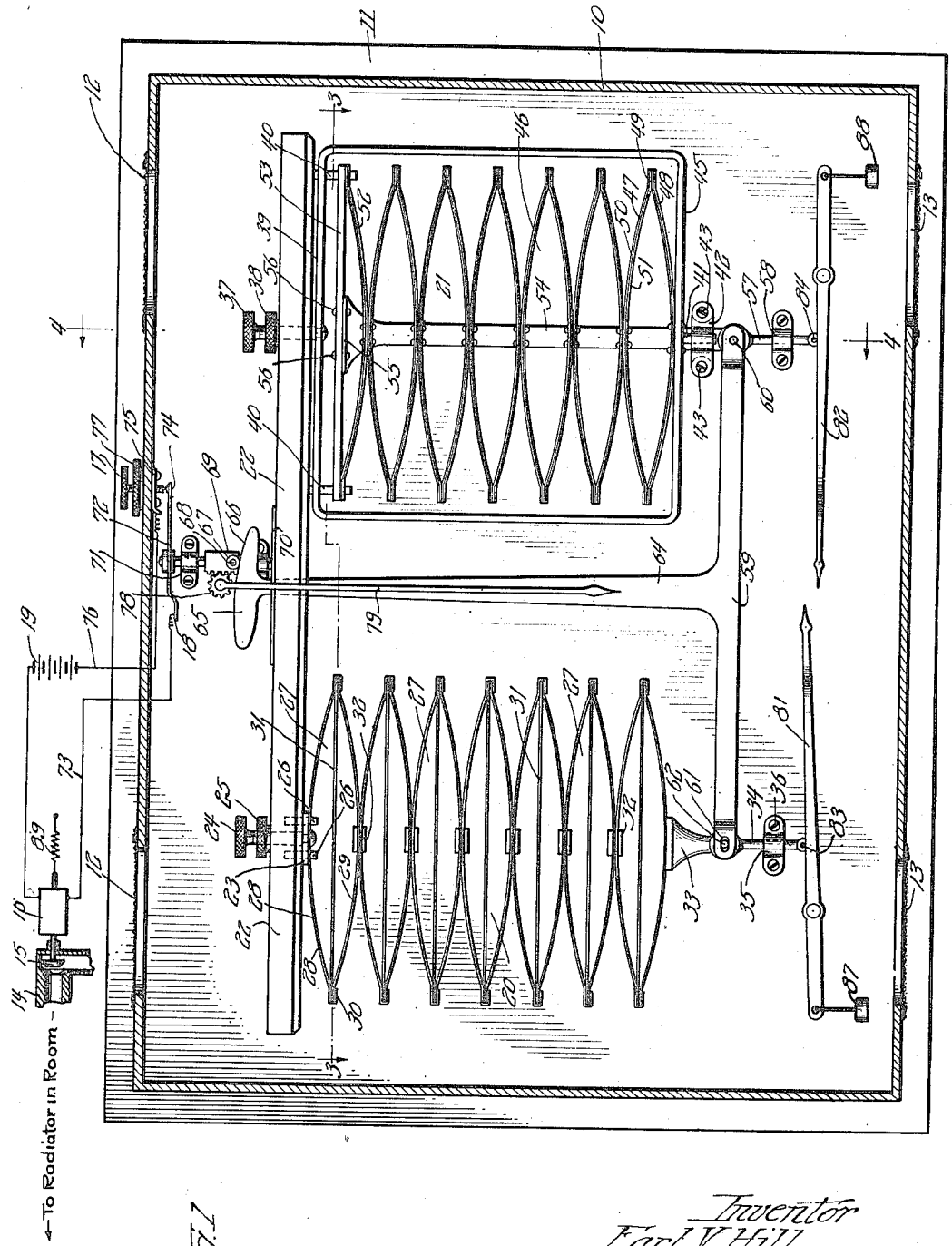
Fig. 1 is an elevation of the apparatus showing the enclosure in section.

Referring to the drawings, 10 represents an enclosing case within which the air-conditioning responsive devices are located, said case or box 10 being mounted on a substantial back-board 11. Preferably, a series of screened apertures 12 in the top and 13 in the bottom of the box facilitate the access of air to the air-responsive members. In the present instance I have indicated the air-conditioning agent as a supply of heat in the form of a steam pipe 14, the flow through which into the radiator or other heat-distributing apparatus, is regulated by a valve 15 actuated by any suitable form of electrically-controlled means, such as a magnet 16. Although I have shown the valve-operating magnet 16 directly connected to the thermostatic contacts 17 and 18 through a battery 19, it will be understood that the indirect method of operation through a local circuit or by means of a pneumatic apparatus, may readily be utilized.

The controlling device comprises, as to its principal elements, a member responsive to change in humidity only, independent of the temperature, or substantially so, and a member which is responsive only to changes in the dry-bulb temperature. These two devices are interconnected in such a way that the condition of balance or equilibrium is secured by the joint or differential action of the two members, the differentially-actuated member of course serving to control the air-conditioning agency,—in this instance, the contacts 17 and 18, controlling the steam supply. 20 designates as a whole the member or device which is responsive to change in moisture, and 21 represents as a whole the member responsive to change in dry-bulb temperature.

As to the moisture-responsive element 20, it will be observed that from the shelf or bracket 22 there is suspended a small plate 23 which is carried in the end of a vertically-arranged screw 24 passing through said bracket 22. The screw 24 is fitted with a lock-nut 25 whereby the vertical position of the plate 23 may be adjusted or set. Preferably, the plate 23 is made with a pair of apertures slidably accommodating fixed spaced vertical pins as 26. The plate 23 serves as a support for, and is secured to, the top half of a bow 27 formed of a pair of curved metallic strips 28 and 29 arranged in outwardly convex relation with reference to each other and united at their edges as by flanging over one of the ends thereof, as shown at 30. The said connection 30 serves also to clamp between the two members 28 and 29 a set of spaced filaments 31, for instance human hair, which have marked hygroscopic properties; that is to say, the sets of hairs when subjected to moist air will lengthen. Preferably, I use a series of said hygroscopic bows 27, the adjacent bows being vertically superposed and united to each other at their centers by juncture plates or clamps 32. By using a plurality of bows, I am enabled to secure a cumulative effect of the series and thereby produce a comparatively large amount of movement of the bottom part of the series when the hygroscopic strands or filaments change in length and thus cause a bulging or a flattening out of the bows. Preferably, the lower bow of the series is connected to a depending bracket 33 having an extension rod 34 arranged to slide loosely in a small fixed guide 35 secured to the back-board 11 of the instrument by screws 36.

Figure 4:
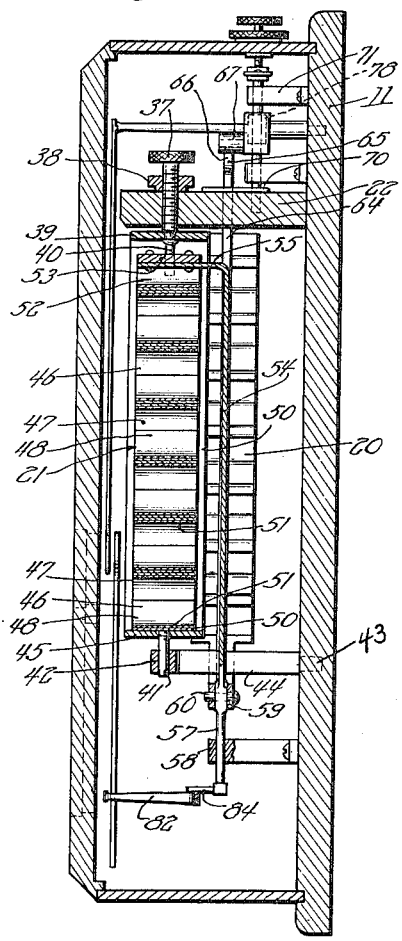
Fig. 4 is a section taken on the line 4—4 of Fig. 1.

Referring now to the temperature-responsive element 21, said member is supported by a screw 37 in a manner similar to the way in which the screw 24 supports the hygroscopic element 20, a similar lock-nut 38 threaded onto the screw 37 serving to lock the temperature element in any desired position of vertical adjustment. The rectangular frame 39 which serves as a support for the temperature element, is carried on the lower end of the screw 37 and is guided by relatively slidable fixed spaced pins 40 at its upper end, said pins preventing the device from twisting around in the case, and having substantially the same function as the pins 26. The lower end of the frame 39 is equipped with a depending guide-pin 41 which slides in a fixed guide 42 secured to the backboard 11 by screws 43 (see Fig. 1) which are threaded into the ends of small spaced standards 44 (see Fig. 4). The bottom bar 45 of the supporting frame 39 supports a series of connected temperature-bows 46, each of said bows comprising a pair of curved strips 47 and 48 united together at their edges, as shown at 49, in any suitable manner. The said strips of metal are composite, the outer or convex surface 50 being formed of some metal which has a high temperature-expansion coefficient, such as brass, while the inner or concave portion of the strip 51 is made of metal which has a very low temperature-expansion coefficient, for instance, the metal which is known among those skilled in the art, as invar steel. The upper element 52 of the temperature-responsive element 21 is made single in the form of half a bow and has its outer ends connected to a yoke 53, the ends of said yoke being suitably apertured to slide freely up and down on the guide-pins 40, previously described. Said pins 40 obviously serve to keep the upper end of the thermostatic element 21 from swaying or twisting. It will be manifest that when the temperature of the air increases or decreases, the cross-bar or yoke 53 will be elevated or depressed in a manner well known to those skilled in the art.

Behind the temperature-responsive element 21 is a link or actuating bar 54, the upper end of which is enlarged and flanged over, as shown at 55, so that it may be connected by rivets 56 to the top bar 53, the lower end of the link 54 extending down below the frame 39 and passing between the standards 44. The lower end of the link 54 is formed with a guide-rod extension 57 which passes loosely through a guide 58 similar to the guide 35, and supported in a similar manner.

It will be understood from the above description that when the percentage of moisture in the atmosphere increases, the element 20, being supported from the top, will contract upwardly and elevate the part 33; while if the temperature increases, the temperature-responsive element 21, being supported at the bottom, will expand upwardly and raise the link 54.

The members 33 and 54 respectively responding to variation in humidity and dry-bulb temperature, are connected for differential action and jointly control the air-conditioning device to be regulated,—in this case, the steam supply. The arrangement is such that when the equivalent wet-bulb temperature, which of course is a function of the dry-bulb temperature and degree of saturation, varies, due either to variation of the humidity or variation of the dry-bulb temperature, the differential member will have a proper corresponding effect on the controlling devices and correct the existing air-condition in order to bring back the atmospheric wet-bulb temperature to the desired value.

The connecting link between the two members comprises a beam 59, one end of which is pivotally connected to a pin 60 projecting from the beam 59, while the other end is slotted, as shown at 61, to engage a somewhat similar pin 62 projecting from the member 63. Said slot is for the purpose of permitting slight angularity of the lever or beam 59 when the pins 62 and 60 rise and fall relatively to each other. On the upper side of the beam 59 is an extension 64 which projects through and above the shelf 22, and above said shelf is arranged to form a T-shaped arm 65, the operative surface of which is made in the form of a curved cam, as at 66. On said cam 66 there operates a small roll 67 carried by a small pin 68 projecting from the side of a rack 69, the ends of which are reduced to slide in the plate 70 and brackets 71, respectively. On the upper end of the rack 69 there is carried a spring 72, preferably insulated, and connected by means of a wire 73 with the valve-actuating magnet 16. On the end of the contact spring 72 is a contact 74 adapted to engage the end of the contact screw 17 which is threaded into a connector-plate 75, which plate is connected by means of a conductor 76 with the battery 19. A nut 77 threaded on the screw 17 serves to lock said screw in any desired position of adjustment.

The rack 69 is supplied for the purpose of meshing with and actuating a small spur-pinion 78 on which is rigidly mounted a pointer 79 extending downwardly and cooperating with a scale 80 to indicate the wet-bulb temperature (see Fig. 2). If desired, pivoted pointers 81 and 82 respectively actuated by pins 83 and 84 projecting from the parts 34 and 57, may be employed in connection with scales 85 and 86 to indicate the relative humidity and the dry-bulb temperature. Said pointers are held in engagement with the pins 83 and 84 by means of small counter-weights 87 and 88.

In view of the above description, the operation of the apparatus is readily apparent. Assuming a deficiency in wet-bulb temperature, said deficiency must of course be caused by either a deficiency in temperature or a deficiency in humidity. Assuming a deficiency in humidity, the hairs 31 contract, the bows 28 expand, and the member 33 falls. This will result in a lowering of the roller 67; hence, the circuit between the contacts 74 and 17 will be broken, the magnet 16 will be de-energized, and the spring 89 will open the valve 15, permitting steam to flow and thus raising the temperature of the air. When the temperature has reached the point at which, in view of the existing degree of saturation, the equivalent desired wet-bulb temperature has been attained, the temperature-responsive element 21 will by that time have expanded, raising the pin 60 and elevating the roller 67 so as to again close the circuit of the magnet 16, shutting off the steam supply and arresting further rise in temperature.

The upper surface 66 on which the roller 67 operates is curved for the purpose of introducing a compensating factor. As is well known, variations in wet-bulb temperature cannot be represented by a straight line with reference to humidity and dry-bulb temperature, hence when the device is working under low humidity conditions, the relative movement of the parts 33 and 54 necessary to correct a given variation in wet-bulb temperature will not be equal to that necessary to correct for a similar wet-bulb variation in temperature when the humidity is comparatively high. Hence, the curvature of the cam surface 66, the manner of operation of which will be obvious.

Figure 5:
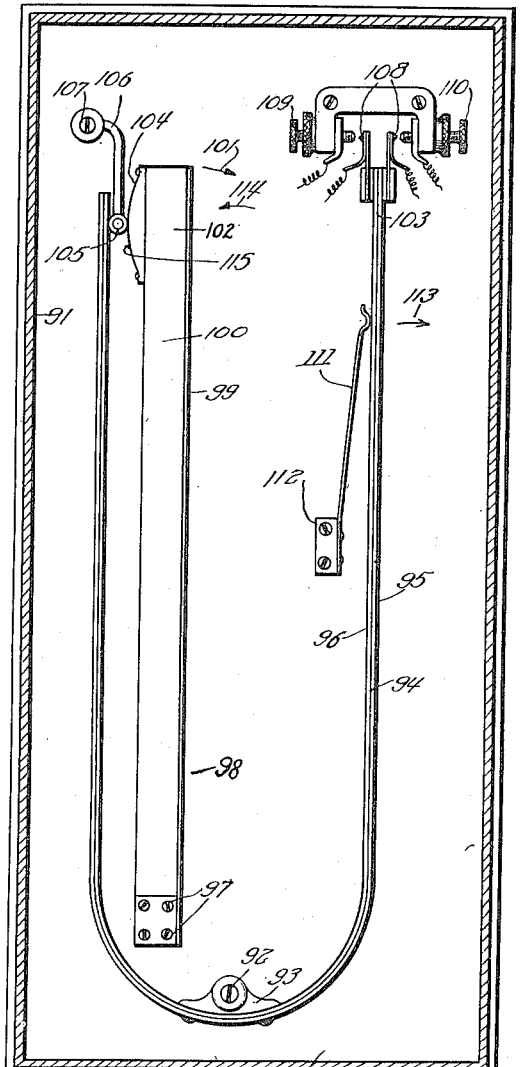
Fig. 5 is an elevation of a modified form of apparatus.

In Fig. 5 I have illustrated a simplified form of device which may be used in situations where extreme accuracy and exact compensation are not required. Referring to said figure, 90 represents a back-board on which the parts of the device are mounted, said back-board being equipped with a suitable enclosing case 91 for protecting the operating parts against dirt or damage. 92 is a fixed pivot forming a bearing for the small bracket 93 riveted to the bend of a U-shaped bi-metallic temperature-responsive element 94, said bi-metallic member 94 having an outer strip 95 of metal substantially non-expansible due to rise in temperature, while the inner strip 96 is made of metal having a high coefficient of expansion. Rigidly secured to the base-board 90 I mount, by means of stout screws 97, the humidity-responsive element designated as a whole 98. Said member 98 is a composite wood and metal strip, the metal strip 99 having a low temperature-expansion coefficient so as to be substantially invariable in length; while the strip 100 is preferably made of cross-grain pine or other material which will expand in a moist atmosphere. With excess of moisture, the member 98 will swing in the direction of the arrow 101, while under rising temperature, the ends 102 and 103 of the U-shaped temperature-responsive element will tend to expand or separate. On the back of the wooden strip 100 I mount a cam-block 104 which engages a roller 105 suspended between the said block 104 and the end 102 by means of a swinging arm 106 pivotally supported on a fixed pin 107.

The right-hand end of the U-member 94 is equipped with suitable insulated contacts 108 cooperating with fixed contact screws 109 and 110 for controlling the air-conditioning devices. A plate-spring 111 secured to the base-board, as shown at 112, is arranged to force the end 103 of the temperature-responsive member 94 in the direction of the arrow 113, thus tending to swing said member 94 on its pivot 92 and cause the end 102 to engage the outer surface of the roller 105.

Said modified form of device operates in substantially the same manner as the embodiment first described. If for any reason there is a deficiency in wet-bulb temperature, caused by either a deficiency in moisture or a deficiency in temperature, in the one case the wooden strip 100 will contract, causing the roller 105 to swing outwardly and rotate the U-bar 94 in the direction of the arrow 114, closing the contact 109 and opening the contact 110; while in the case of a fall in temperature, the U-member 94 will contract, causing the end 103 to move in the direction of the arrow 114.

In the case of this modification as at first described, a compensating factor may be introduced. In this modified form, compensation is secured by making the operative surface of the cam-block 104 curved, as shown at 115.

Inasmuch as the details of construction and operation herein described are merely illustrative of a single application of my invention, it will be understood that the scope of the invention is to be determined by reference to the appended claims, said claims being construed as broadly as possible consistent with the state of the art.

I claim as my invention:

1. The improvement in the art of conditioning air where the humidity is permitted to vary, which consists in automatically co-relating the temperature and the humidity to maintain the wet-bulb temperature constant while permitting the dry-bulb temperature to change.

2. The improvement in the art of heating buildings, which consists in automatically adjusting the temperature and humidity relatively to each other, while permitting variation in absolute values of humidity and dry-bulb temperature.

3. The improvement in the art of heating buildings, which consists in maintaining the wet-bulb temperature substantially uniform under varying conditions of humidity.

4. The improvement in the art of heating buildings for human occupancy, where the humidity cannot be maintained constant, which consists in automatically adjusting a supply of heat according to the wet-bulb temperature.

5. The improvement in the art of heating buildings where the humidity is permitted to vary, which consists in automatically controlling a heat supply to provide a higher or lower dry-bulb temperature as the humidity respectively decreases or increases.

6. The improvement in the art of heating buildings where the humidity is permitted to vary, which consists in automatically controlling a heat supply to furnish a greater or less amount of heat as the dry-bulb temperature respectively tends to fall or rise while simultaneously automatically regulating the effect of said control in accordance with change of humidity so as to maintain a higher or lower dry-bulb temperature when the humidity respectively falls or rises.

EARL V. HILL.